(12) United States Patent
Doi et al.

(10) Patent No.: US 8,805,557 B2
(45) Date of Patent: Aug. 12, 2014

(54) CONTROL SYSTEM, CONTROL DEVICE, AND CONTROL METHOD

(75) Inventors: Yusuke Doi, Yokohama (JP); Yu Kaneko, Yokohama (JP); Tomonori Maegawa, Tokyo (JP); Masahiro Ishiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 610 days.

(21) Appl. No.: 12/403,073

(22) Filed: Mar. 12, 2009

(65) Prior Publication Data
US 2009/0234468 A1 Sep. 17, 2009

(30) Foreign Application Priority Data
Mar. 13, 2008 (JP) .................... 2008-064431

(51) Int. Cl.
*G05B 11/32* (2006.01)
*G06F 17/30* (2006.01)

(52) U.S. Cl.
USPC .............................. 700/67; 707/3

(58) Field of Classification Search
None
See application file for complete search history.

(56) References Cited

U.S. PATENT DOCUMENTS 5,978,850 A * 11/1999 Ramachandran et al. .... 709/228
6,185,581 B1 * 2/2001 Garthwaite ........................ 1/1
6,847,850 B2 * 1/2005 Grumelart ...................... 700/37
7,137,017 B2 * 11/2006 Itoh .............................. 713/322
7,561,930 B2 * 7/2009 Sokolova et al. ............... 700/87

FOREIGN PATENT DOCUMENTS

JP 2006-344017 12/2006

OTHER PUBLICATIONS

Profibus Nutzerorganisation e.V., "Profibus Technical Description", Technical Description, Order-No. 4.002, Profibus Nutzerorganisation e.V., Haid-und-Neu-Str. 7, D-76131 Karlsruhe, DE, 1999, pp. 1-34.*
SYSMAC, CX-Profibus Ver. 1.0 Operation Manual, Catalog No. WS02-9094G, OMRON, 2005, pp. 1-137.*

* cited by examiner

*Primary Examiner* — Kakali Chaki
*Assistant Examiner* — Walter Hanchak
(74) *Attorney, Agent, or Firm* — Oblon, Spivak, McClelland, Maier & Neustadt, L.L.P.

(57) ABSTRACT

A control system includes a control device for controlling a plurality of actuators by executing a plurality of functions based sensor values from a plurality of external sensors and a function providing device for providing the control device with the functions to be executed by the control device. The function providing device accepts a program including a plurality of functions from a user device, finds a new function among the functions which has not been received yet and pass the same function to the control device. The control device executes functions passed from the function providing device based on values of the external sensors and controls the actuators by transmitting values of output arguments of the functions to the actuators.

19 Claims, 8 Drawing Sheets

| CHARACTER STRING OF REQUEST PROCESSING FUNCTION (f) | CHANNEL INFORMATION |
|---|---|
| (I (>= select (STAT A B C D E F) "average" 28) X) | (I (>= select (STAT A B C D E F) "average" 28) X)<br>192.168.11.1 |
| (STAT A B C D E F) | (STAT A B C D E F)<br>192.168.11.1 |
| (>= select (STAT A B C D E F) "average" 28) | (>= select (STAT A B C D E F) "average" 28)<br>192.168.11.1 |
| (select (STAT A B C D E F) "average" ) | (select (STAT A B C D E F) "average" )<br>192.168.11.1 |

FIG. 8

CONTROL SYSTEM, CONTROL DEVICE, AND CONTROL METHOD

CROSS-REFERENCE TO RELATED APPLICATIONS

This application is based upon and claims the benefit of priority from the prior Japanese Patent Applications No. 2008-64431, filed on Mar. 13, 2008; the entire contents of which are incorporated herein by reference.

BACKGROUND OF THE INVENTION

The present invention relates to a control system, a control device, and a control method for controlling actuators based on external sensors.

RELATED ART

In application of a sensor network, it is difficult to give flexible and efficient operational instructions to a large number of computers. When design of utilization in advance is difficult, e.g., when utilization by diverse users is expected, it is not easy to build a system that can meet demands that change from day to day.

JP-A 2006-344017 (Kokai) titled "Sensor network system and data processing method for sensor network system" (by Hitachi Ltd.) handles an issue of flexibly programming a large number of devices by deploying a hierarchized program (script) to among nodes that are connected by a network.

In conventional methods including the one by JP-A 2006-344017 (Kokai), similar programs can be introduced to individual devices when many users independently write programs. For instance, in application of a sensor network, general types of processing such as acquisition of an average value of temperature sensors within a certain area can be performed by a large number of users.

In such a situation, the processing capacity of sensor nodes or relay nodes which is originally small could be exhausted when many user introduce a large number of identical or similar programs.

SUMMARY OF THE INVENTION

According to an aspect of the present invention, there is provided with a control system comprising a control device for controlling a plurality of actuators by executing a plurality of functions based sensor values from a plurality of external sensors and a function providing device for providing the control device with the functions to be executed by the control device, wherein (A) the function providing device comprises:
  a program accepting unit configured to accept a program containing a plurality of functions, from a user device wherein
    each of the functions in the program has an input argument showing at least one of: the external sensors and other functions than said each of the functions, and
    at least one of the functions in the program has an output argument showing at least one of the actuators;
  an identifier storage configured to store a plurality of identifiers of functions;
  a function detecting unit configured to detect a function for which matching identifier is not stored in the identifier storage among the functions contained in the program, by searching the identifier storage;
  an identifier registering unit configured to register the identifier of the detected function in the identifier storage; and
  a function providing unit configured to provide the detected function to the control device, (B) the control device comprises:
  a function accepting unit configured to accept the function detected by the function providing unit of the function providing device;
  a function storage configured to store functions accepted by the function accepting unit:
  a function executing unit configured to receive an input argument of each of the functions stored in the function storage, and execute each of the functions based on the input argument of each of the functions;
  a first channel managing unit configured to manage a plurality of first channels corresponding to the external sensors, receive the sensor values via the first channels from the external sensors, and transmit each of the sensor values received for each of the first channels to the function executing unit as an input argument of one of the functions that is pre-instructed for each of the first channels;
  a second channel managing unit configured to manage each of a plurality of second channels corresponding to each of the actuators, and transmit each of values received via each of the second channels to each of the actuators corresponding to each of the second channels;
  an output argument transmission processor configured to transmit a value of the output argument obtained by execution of a function that contains the output argument among the functions executed by the function executing unit, to the second channel managing unit while designating one of the second channels that corresponds to the actuator designated by the output argument;
  a third channel generating unit configured to generate a third channel correspondingly to the function accepted by the function accepting unit;
  a third channel managing unit configured to manage a plurality of third channels generated by the third channel generating unit, and transmit each of values received via each of the third channels to the function executing unit as an input argument of one of the functions that is pre-instructed for each of the third channels;
  a function output transmission processor configured to transmit an output value of each of the functions in the function storage that results from execution thereof to the third channel managing unit while designating each of the third channels that corresponds to each of the functions; and
  a transmission instructing unit configured to identify a first or third channel corresponding to one of the external sensors or one of the other functions that is designated as the input argument of the function accepted by the function accepting unit, and instruct the first channel managing unit or the third channel managing unit to transmit a value received via the identified first or identified third channel to the function executing unit as the input argument of the function.

According to an aspect of the present invention, there is provided with a control device for controlling a plurality of actuators by executing a plurality of functions based sensor values from a plurality of external sensors, comprising:
  a function accepting unit configured to accept a function from an external function providing device, wherein the function has an input argument showing at least one of: the external sensors and other functions, and has an output argument showing at least one of the actuators;
  a function storage configured to store functions accepted by the function accepting unit:

a function executing unit configured to receive an input argument of each of the functions stored in the function storage, and execute each of the functions based on the input argument of each of the functions;

a first channel managing unit configured to manage a plurality of first channels corresponding to the external sensors, receive the sensor values via the first channels from the external sensors, and transmit each of the sensor values received for each of the first channels to the function executing unit as an input argument of one of the functions that is pre-instructed for each of the first channels;

a second channel managing unit configured to manage each of a plurality of second channels corresponding to each of the actuators, and transmit each of values received via each of the second channels to each of the actuators corresponding to each of the second channels;

an output argument transmission processor configured to transmit a value of the output argument obtained by execution of a function that contains the output argument among the functions executed by the function executing unit, to the second channel managing unit while designating one of the second channels that corresponds to the actuator designated by the output argument;

a third channel generating unit configured to generate a third channel correspondingly to the function accepted by the function accepting unit;

a third channel managing unit configured to manage a plurality of third channels generated by the third channel generating unit, and transmit each of values received via each of the third channels to the function executing unit as an input argument of one of the functions that is pre-instructed for each of the third channels;

a function output transmission processor configured to transmit an output value of each of the functions in the function storage that results from execution thereof to the third channel managing unit while designating each of the third channels that corresponds to each of the functions; and a transmission instructing unit configured to identify a first or third channel corresponding to one of the external sensors or one of the other functions that is designated as the input argument of the function accepted by the function accepting unit, and instruct the first channel managing unit or the third channel managing unit to transmit a value received via the identified first or identified third channel to the function executing unit as the input argument of the function.

According to an aspect of the present invention, there is provided with a control method for controlling a plurality of actuators by executing a plurality of functions based sensor values from a plurality of external sensors, comprising:

accepting a program containing a plurality of functions, from a user device wherein each of the functions in the program has an input argument showing at least one of: the external sensors and other functions than said each of the functions, and at least one of the functions in the program has an output argument showing at least one of the actuators;

searching an identifier storage which stores a plurality of identifiers of functions and detecting a function for which matching identifier is not stored in the identifier storage among the functions contained in the program;

registering the identifier of the detected function in the identifier storage; and storing the detected function in a function storage;

receiving an input argument of each of functions stored in the function storage, and performing execution processing on each of the functions based on the input argument of each of the functions;

performing first management processing on a plurality of first channels corresponding to the external sensors, receiving the sensor values via the first channels from the external sensors, and transmitting each of the sensor values received for each of the first channels to the execution processing as an input argument of one of the functions that is pre-instructed for each of the first channels;

performing second management processing on each of a plurality of second channels corresponding to each of the actuators, and transmit each of values received via each of the second channels to each of the actuators corresponding to each of the second channels;

transmitting a value of the output argument obtained by execution of a function that contains the output argument among the functions executed by the execution processing, to the second management processing while designating one of the second channels that corresponds to the actuator designated by the output argument;

generating a third channel correspondingly to the detected function according to the detection of the function for which matching identifier is not stored in the identifier storage;

performing third management processing on a plurality of third channels generated by the third channel generating unit, and transmit each of values received via each of the third channels to the execution processing as an input argument of one of the functions that is pre-instructed for each of the third channels;

transmitting an output value of each of the functions in the function storage that results from execution thereof to the third management processing while designating each of the third channels that corresponds to each of the functions; and identifying a first or third channel corresponding to one of the external sensors or one of the other functions that is designated as the input argument of the detected function, and instruct the first management processing or the third management processing to transmit a value received via the identified first or identified third channel to the execution processing as the input argument of the function.

BRIEF DESCRIPTION OF THE DRAWINGS

FIG. 8 shows an example of an index table stored in an index device.

DETAILED DESCRIPTION OF THE INVENTION

An embodiment of the present invention will be described with reference to drawings.

Figure 1:
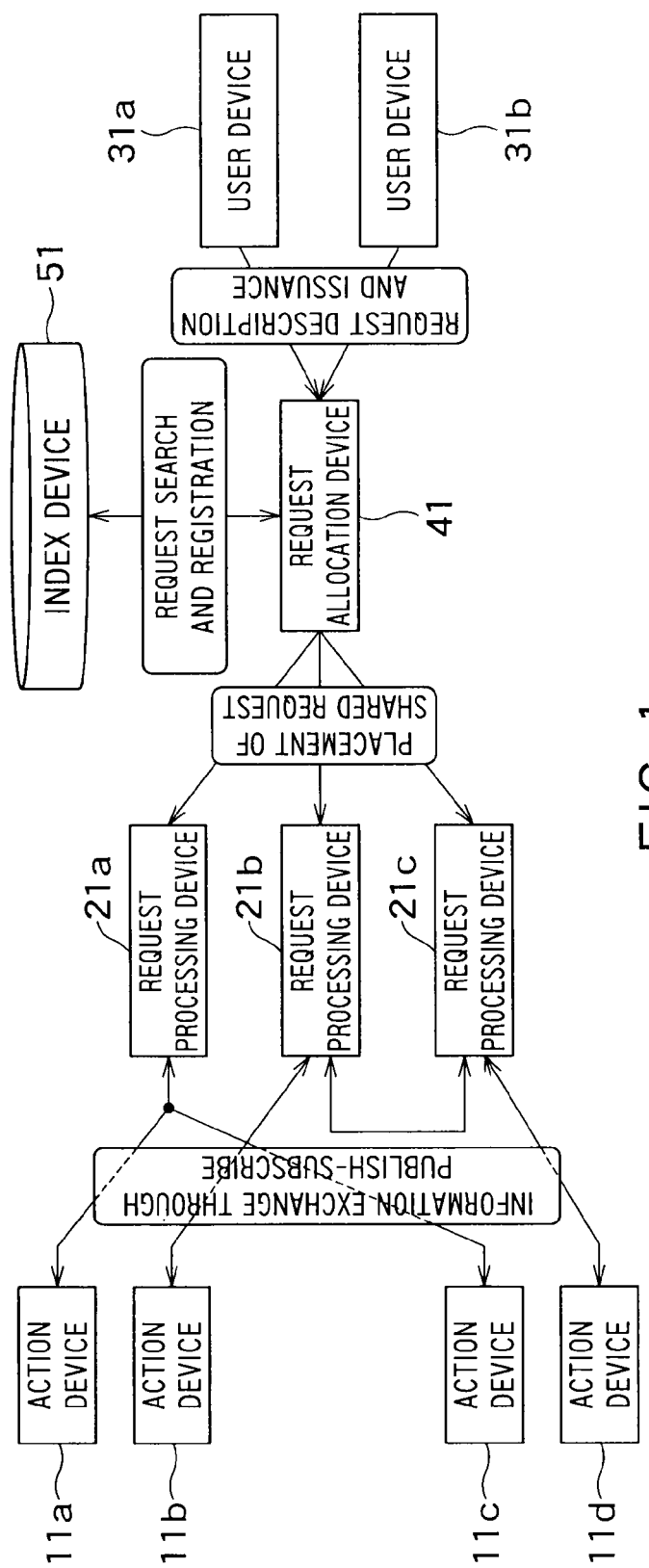
FIG. 1 is a block diagram generally showing the configuration of a distributed processing system as an embodiment of the present invention.

FIG. 1 is a block diagram showing the configuration of a control system (a distributed processing system) as an embodiment of the invention. A request allocation device 41 (or a set of request allocation devices that are designed to be redundant and in cooperation with each other) administrates a number of action devices (sensors and actuators) 11*a* to 11*d*, a number of request processing devices (control devices) 21*a* to 21*c*, and a number of user devices 31*a* to 31*b*. A set of the request allocation device 41 and an index device 51 constitutes a function providing device. In the following, the overview of the present system is first shown and then details of individual components are described.

The action devices 11*a* and 11*b* are sensors and the action devices 11*c* and 11*d* are actuators, and these action devices have the capability to interact with an environment. Each of the action devices has communication capability for communicating with a request processing device (or control device), and more specifically, the action devices perform such communication by interacting with channels managed by the request processing devices (control devices) 21*a* to 21*c*. The action devices each have a unique identifier (ID) and perform interaction with a channel that has an identifier calculated from that ID (e.g., a channel having the same name as the ID). The identifier may be an IP address, MAC address, or other indices. When the action device is a sensor, it outputs a sensor value (an observation value) to the channel, and when the action device is an actuator, it operates in response to an instruction supplied from the channel. As mentioned later, a channel communicating with a sensor corresponds to a first channel having a first identifier, and a channel communicating with an actuator corresponds to a second channel having a second identifier.

The request processing devices (control devices) 21*a* to 21*c* are utilized by the single request allocation device 41. The request processing devices (control devices) correspond to floor controllers in a building managing network, for example, and they are connected via a network such that they can communicate with each other. Each of the request processing devices (control devices) is connected to an action device for which that request processing device is responsible by Internet Protocol (IP), BACnet (a trademark of BACnet ASHRAE), or the like. Each of the action devices is connected to one of the request processing devices (control devices) 21*a* to 21*c*. A channel relating to each action device is registered with (or created on) a request processing device (control device) which is responsible for the action device.

Figure 2:
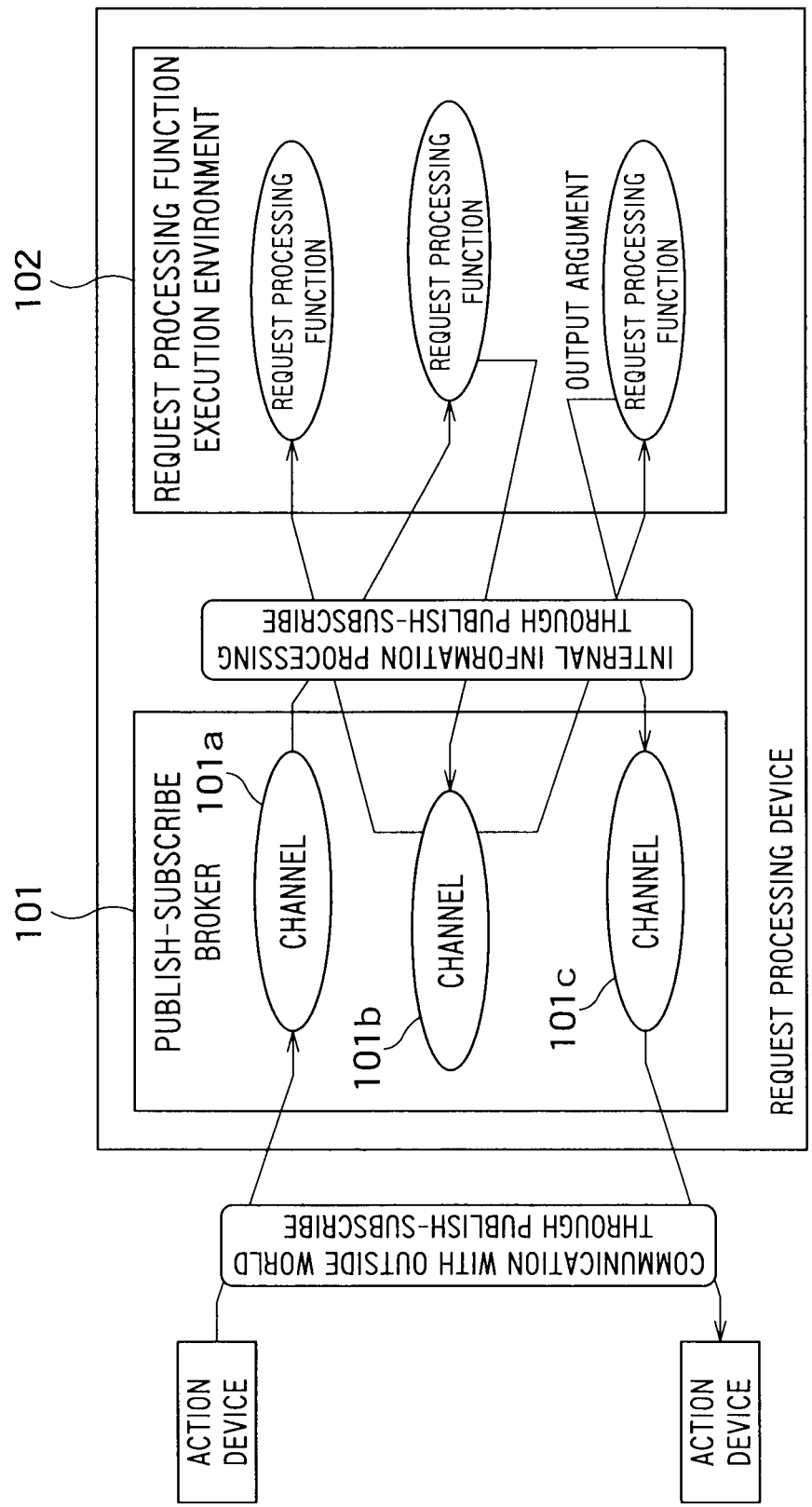
FIG. 2 shows the internal configuration of a request processing device (a control device)

The request processing devices (control devices) 21*a* to 21*c* control actuators by executing a function (a request processing function) based on sensor values from sensors. The request processing devices (control devices) 21*a* to 21*c* intervene the user devices 31*a* to 31*b* and the action devices 11*a* to 11*d*, and instantiate a request processing function supplied by a user device via the request allocation device 41. That is, the request processing devices (control devices) 21*a* to 21*c* keep the request processing function, associate the function with a relevant channel, and execute it at a desired time. An exemplary configuration of the request processing device (control device) is shown in FIG. 2.

The request processing device (control device) has a Publish-subscribe broker 101 and a request processing function execution environment 102. The Publish-Subscribe broker 101 includes a first channel managing unit, a second channel managing unit, and a third channel managing unit. The request processing function execution environment 102 includes a function accepting unit, a function executing unit, a third channel generating unit, a function output transmission processor, and a transmission instructing unit.

The Publish-Subscribe broker 101 manages channels utilized by action devices and channels utilized by request processing functions. The request processing function execution environment 102 performs instantiation of a plurality of request processing functions.

Data transmission and reception among action devices and request processing functions is performed via channels managed by the Publish-subscribe broker 101. In other words, data is transmitted and received via a channel, and a request processing function receives data from a channel and transmits data to a channel. A sensor transmits data to a channel, and an actuator receives data from a channel.

A channel that receives data from a sensor and passes the data to a request processing function corresponds to a first channel, a channel that receives an output value of a function from the request processing function and passes the output value to another request processing function corresponds to a third channel, and a channel that receives a value of an output argument from a request processing function and passes the value to an actuator corresponds to a second channel. In the figure, reference numeral 101*a* denotes the first channel, 101*b* the third channel, and 101*c* the second channel. The third channel has an identifier (a third identifier) that is formed of description of a request processing function which is a transmission source of the output value. The first to third channels are managed by the first to third channel managing units, or first to third managing processing, respectively.

A channel as called herein refers to a virtual communication path based on Publish-Subscribe model, which underlies the present system. Data generator and consumer exchange data by way of a channel. In reality, a request processing device (control device) serves as a so-called broker, mediating communication between a generator (e.g., a sensor, and a request processing function) and a consumer (e.g., an actuator, and a request processing function).

This model is different from a typical request-response model in that the consumer registers information on itself in advance to a channel in which necessary data flows and receives data when each piece of data is placed on the channel. Hereinafter, transmission of data onto a channel may be referred to as "publish" and registration of consumer information to a channel so as to enable reception of data transmitted on the channel may be referred to as "subscribe". Communication via a channel is possible not only within the same request processing device (control device) but between separate request processing devices (control devices). The request processing devices (control devices) accordingly each have a communication unit for communicating with each other.

A request processing function subscribes to one or more channels (one of the first and third channels, or both) (incidentally, the subscribe is corresponding to processing by the transmission instructing unit), performs an operation based on predetermined determination and processing at a predetermined time in response to an input to those channels, and publishes the result of the operation (i.e. an output value of the function) and a value of an output argument if the same exists, to one or more channels (the third or second channel) as required (the publish is corresponding to processing by the function output transmission processor and an output argument transmission processor). Depending on the result of determination and processing, publishing may not be performed. The request processing function performs an operation with information received from a channel (either the first or third channel, or both) as an input argument to extract useful information, and outputs the information to a channel (the second or third channel). Information extracted by a request processing function that pertains to the second channel (i.e., a value of an output argument) corresponds to a control instruction to an actuator that operates on an environment.

Here, the substance of a channel is an object that maintains a channel identifier and a destination list of subscribers. Each channel behaves to transfer input data to subscribers indicated in the destination list. On the request allocation device 41 and the index device 51 discussed below, each channel is identified as channel information with a pair of a channel identifier and a request processing device (control device) identifier in order to show to which request processing device (control device) the channel belongs.

Each channel maintains a destination table and rewrites the table according to a subscribe request or an unsubscribe request from a consumer that needs data on a certain channel. When data from a source (a sensor or a request processing function) has arrived at a channel, the channel transmits the data to individual destinations (actuators or request processing functions) in accordance with the contents of the destination table at the time.

The channel to which data is input from a sensor (the first channel) and the channel for outputting data to an actuator (the second channel) may be manually registered to the broker 101, or may be registered on demand from an action device (a sensor or actuator). The Publish-Subscribe broker 101 may have a first channel creating unit and a second channel creating unit that create first and second channels under the user's directions or on demand from an action device.

The user devices 31*a* and 31*b* input a program in which a request for the sensor network is described by the user and transmit the input program to the request allocation device 41. The program describing the user's request is defined as a link (or a graph) between the type of a request processing function and a channel associated with the input and output of the request processing function. More specifically, the program contains a plurality of request processing functions that perform operations using arguments (input and output arguments). Each request processing function designates as an input argument at least one of: first channels and other request processing functions other than the each request processing function among the request processing functions. In other words, each request processing function describes at least one of: the identifiers of a first channel and other request processing functions in its input argument portion. Also, at least one request processing function designates at least one second channel as the output argument. That is to say, at least one request processing function describes the identifier of at least one second channel in its output argument portion. The details of the program are described later.

The index device 51 maintains correspondence between the character strings of a request processing function (i.e., a request processing function itself) and channel information (a pair of character string of the request processing function and the identifier of a request processing device (control device) that executes the request processing function). The index device 51 includes an identifier storage for storing identifiers of request processing functions (e.g., character strings of request processing functions). An example of data stored on the index device 51 is shown in FIG. 8. FIG. 8 shows a number of pairs of character string of a request processing function and corresponding channel information. Details of FIG. 8 will be described below.

The request allocation device 41 requests the index device 51 to examine whether each request processing function contained in the program input by the user device is already registered in the index device 51. Specifically, the request allocation device 41 recursively extracts subgraphs from a graph corresponding to a request from the user device (a link between the type of the request processing function and a channel associated with the input/output of the function), and requests the index device 51 for examination on individual subgraphs. In response to the request from the request allocation device 41, the index device 51 examines whether each request processing function is already registered and returns the result of examination showing whether the function is already registered or not.

As a result of search, if a request processing function that realizes the same processing has been registered (i.e., a request processing function that uses the same input channel and provides the same output value), the request allocation device 41 determines that the request processing function of interest is already instantiated on a request processing device (control device) and can be shared. If a request processing function that realizes the same processing is not registered on the index device 51, the request allocation device 41 selects a request processing device (a control device) that should instantiate the request processing function, and requests the index device 51 to register the character string of the request processing function and channel information (a pair of the character string and the identifier of the selected request processing device (control device)), and the index device 51 registers those pieces of information.

When search is requested from the index device 51, the request processing function may be normalized by rearranging the character string thereof according to a certain rule (will be described in greater detail later) and search may be requested based on the normalized function. If a search does not return a hit, registration of the normalized character strings may be requested. Also when search is requested, the character string of the request processing function may be encoded following a certain procedure and search may be requested based on the encoded character strings (i.e., a code expression of the function). If a search does not return a hit, registration of the encoded character strings may be requested. In addition, when encoding is performed, normalization may be performed prior to encoding. The index device 51 may have a normalizing unit for normalizing a request processing function or an encoding unit for encoding the codes of a request processing function to generate encoded function data.

The request allocation device 41 requests the selected request processing device (control device) to instantiate the request processing function that is not registered to the index device 51. In response to the request, the request processing function execution environment 102 of the request processing device (control device) keeps the request processing function in association with its input and output channels, and executes the function at a desired time (e.g., when data arrives the channel to which the function subscribes). More specifically, if an input channel already exists, the request processing function is associated with the input channel, and if an input channel does not exist yet, the function is associated with an input channel when one is created. An output channel identified by the description of the request processing function (the third channel) is also created, and the function is associated with the output channel (in FIG. 2, the output channel of the request processing function positioned at the top is omitted for the sake of simplicity). If an output argument exists in the request processing function, the request processing function is associated with an output channel (a second channel) that is designated for the output argument (in this case, the output value of the function does not exist (i.e., is NULL), thus generation of and association with a third channel for the function may be omitted. See the request processing function positioned at the bottom in FIG. 2).

The control system of FIG. 1 so far described will be described in further detail.

First, details of the request processing device (control device) shown in FIG. 2 is described.

As mentioned above, the Publish-Subscribe broker 101 manages a plurality of channels, but a single channel may be utilized by a number of request processing devices (control devices). This may be the case when data from a certain sensor is required by multiple request processing functions, or when an output value of one request processing function is required by multiple request processing functions, for example.

One way of realizing this is to distribute and manage a channel destination table among the brokers 101 of request processing devices (control devices) so that brokers 101 that need data are included in the destination tables of other brokers 101 and they transfer data that has reached them to one another. In this case, a mechanism for avoiding message loop is necessary.

As another way, one request processing device (control device) may serve as the master broker for one channel and that request processing device may be entirely responsible for destination management on the channel. In such a case, it is necessary to summarize how and which channels are managed and utilized by which request processing device (control device). The summarization may be done on the index device, or other means of channel management and allocation may be prepared. For example, when development on a larger scale is expected, application-level multicast, such as Scribe (M. Castro, R Druschel, A-M. Kermarrec, and A. Rowstron. Scalable application-level anycast for highly dynamic groups. In Proceedings of NGC 2003, September 2003), may be utilized.

The request processing function execution environment 102 instantiates a request processing function provided by the request allocation device 41, as mentioned above. Specifically, the request processing function execution environment 102 receives a request processing function provided from the request allocation device 41 (this is corresponding to processing by the function accepting unit), keeps the provided request processing function (this is corresponding to processing by the function storage), associates the function with input and output channels, and executes the function at a desired time (this is corresponding to processing by the function executing unit). As a specific example of the request processing function execution environment 102, something like a virtual machine or a Servlet execution environment in Java (a registered trademark) is envisioned.

Each request processing function can subscribe to one or more channels and publish to one or more channels as mentioned above. Each function may also maintain internal memory (state).

The request processing function execution environment 102 activates the request processing function when data has arrived on a channel to which the request processing function subscribes, rewrites the internal memory in a short amount of time, completes necessary data processing and also performs publishing.

To regularly execute a request processing function, a virtual clock channel may be defined in each Publish-Subscribe broker 101 so that a request processing function that needs to be periodically executed should subscribe to an appropriate clock channel. The broker 101 instantiates the virtual clock channel when a subscribe request has arrived and supplies a periodic event to the request processing function to thereby activate the request processing function.

A request processing function has at least the following elements:

An arbitrary number of channel inputs
Substance (or type) of processing
One or more channel outputs.

Channels handled in this embodiment may be particularly called "unnamed channels". An unnamed channel refers to a channel that is uniquely identified by the identifier of an action device or the input and processing substance of a request processing function. By way of example, assuming that there are "i" number of channels corresponding to an action device and the identifier of the action device is "N", an unnamed channel is a channel that is identified by an identifier of "N[i]".

Also, a mechanism called a window for realizing asynchronous operation and recording internal state may be introduced to a channel input portion within a request processing function. A window is a mechanism having an internal storage of a certain capacity and the internal state is updated through simple operation of the contents of the internal storage and input from a channel. The window may have the capability to calculate a simple latest value, or maximum, minimum, or average value of a certain number of elements or within a certain time period. The window can also be described as a qualifier to a channel. For example, the latest value for a channel X may be described as "channel X. current". In the following examples, however, windows are not explicitly expressed and all values discussed are latest values for simplicity.

For a channel qualifier, a window is converted to obtain a request processing function and only its inner terms are evaluated in the course of processing according to a request allocation algorithm discussed later. For instance, "(f1(f2 A).current)" is converted to '(f1(select(f2 A)"current"))', wherein "f1" and "f2" are request processing functions; "(f2 A)" is an output value resulting from processing "A" with the request processing function "f2; and '(select(f2 A)"current")' is the latest value of "(f2 A)" as of when it is obtained.

However, in a phase of instantiation on a request processing device (control device), a request processing function may be instantiated for "select" (that is, a request processing function that has "(f2A)" as the input channel and obtains the latest value of "(f2A)" is instantiated, and the output value of the function (i.e., the result of operation) is output to a channel that has the name of '(select(f2 A)"current")'). Alternatively, the request processing function may be processed at the time of input to "f1" (that is, a request processing function that has "(f2 A)" as the input channel and obtains the latest value of "(f2 A)" and also performs processing based on "(f1)" is instantiated, and the output value of the function (i.e., the result of operation) is output to a channel having the name of '(f1(select(f2 A)"current"))'). The latter case has an advantage of enabling the internal memory of the window to be shared through instantiation, or an advantage of preventing increase in the number of channels by including a window in request processing functions that have been instantiated. Which of the two cases is more efficient for a given program may be determined by a request processing device (control device).

Here, a plurality of request processing functions may be regarded as equivalent (or regarded as identical) on the following conditions.

Processing based on an algorithm that provides equivalent output when input channels are identical will provide equivalent output if substance of processing and input channels match. In other words, request processing functions that have matching substance of processing and matching input channels can be regarded as equivalent.

Also, for request processing functions for which the order of input channels does not affect the result, it is assumed that request processing functions having different orders of input channels can also be regarded as identical by normalizing the input channels according to a certain rule.

Normalization refers to rewriting of a request processing function to the extent that the result of operation is not affected. To be specific, normalization is performed by recursively sorting arguments that are given to a request processing function according to the following rules:

(1) Target only a portion in which an argument can be replaced in a request processing function.

(2) Replaceable arguments are sorted by type in the following order, for example:

Constant

Channel

Request processing function.

Arguments in a request processing function are similarly sorted within the request processing function (3) Arguments of the same type are compared by hash value that is obtained by inputting the character string expression of the arguments to a particular hash function (e.g., SHA-1), and sorted in ascending or descending order of hash value.

With such normalization, program processing which can involve diverse expressions becomes more likely to be sharable.

For example, consider a request processing function that outputs the maximum value of outputs from sensors X and Y when the outputs are obtained from channels X and Y, respectively. Assuming that the request processing function that takes the maximum of latest values of sensor "X" and "Y" has a name of "MAX", the substance or instance of this request processing function can be described with an S-expression as shown below, for example:

(MAX X Y)

Since the order relation between "X" and "Y" does not affect the result of calculation, this S-expression is equivalent to the expression:

(MAX Y X).

Such a request processing function for which various expressions can hold is normalized by sorting.

Assuming that expression after normalization is "(MAX X Y)", the calculation result is automatically output to a channel that is identified by the name of "(MAX X Y)". Thus, when the function instantiation capability of the request processing function execution environment 102 in the request processing device (control device) receives a request processing function to be instantiated (e.g., a normalized one) from the request allocation device 41, it can register a channel that is identified by the character string of the request processing function to the broker 101 and output the result of calculation with the request processing function (the output value of the function) to the registered channel. This channel is specifically called an "unnamed channel" because an expression that represents calculation itself also serves as a channel identifier, as mentioned above.

While the above example uses an S-expression for the sake of simplicity, an unnamed channel can be similarly defined in XML or a similar tree-structured program expression that is normalized according to a certain procedure, or other arbitrary expression forms. It is desirable that the same calculation conforms to a expression form within one system. In addition, because it is disadvantageous for implementation that channel identifiers are long when considering nesting of expressions discussed below, for a byte string that represents an expression (e.g., (MAX X Y)), a hash value may be calculated and the hash value may be used as the identifier of a channel.

It is assumed that the timing of driving processing for the request processing function (a driving mode) is defined by processing of "MAX" itself. This timing may be a mode in which processing is performed triggered by an input update from a certain channel (using event-driving terminology, in response to arrival of an event) (single channel driving), a mode in which processing is performed every time there is an input update from a plurality of channels (multiple channel driving), a mode in which processing is periodically performed at regular time intervals (time driving), or the like. Some of such modes are based on the premise that a window is given to each channel in a request processing function.

The details of the request allocation device 41 will be now described.

First, the purpose of the request allocation device 41 is described using a specific example.

For instance, suppose that sensors A, B, C, D, E and F are installed in a building and they regularly output temperature data to channels that are defined with their respective names. There are also a switch X for controlling air conditioning and an alarm Y for informing an anomalous condition and they both operate or stop operation in response to a Boolean input (i.e., a binary input of "t" or "nil") from channels having the same names as them. The switch and alarm correspond to actuators.

To the building, two such programs 1 and 2 as described below are introduced by user devices:

1. With 28 degrees as a threshold value, turn on air conditioning when the average of "A" to "F" is equal to or greater than the threshold value (i.e., turn on the switch X) and stop air conditioning when the average is below the threshold (turn off the switch X)

2. With 80 degrees as a threshold value, actuate the alarm when the maximum of "A" to "F" is equal to or greater than the threshold and stop the alarm when the maximum is below the threshold.

These two programs are written as shown below, for example, without consideration of each other:

Program 1: (|(>=(AVERAGE A B C D E F)28)X)

Program 2: (|(>=(MAX A B C D E F)80)Y).

Each of the programs contains a plurality of request processing functions. Examples of request processing function types are shown in Table 1. Of the request processing functions shown, output values of request processing functions (the operation result of the request processing functions) except "|" can be utilized in other request processing functions. On the other hand, "|" (a substitution function) is not for utilizing an output value of a request processing function (the operation result of a request processing function). To be specific, "|" is utilized for defining something like side effect that couples channels by giving an actuator channel (an unnamed channel) as the second argument of "|" (an output argument), and selecting an actuator to which the program is finally output.

TABLE 1 examples of request processing functions

| Type of request processing function | Driving mode | Processing |
|---|---|---|
| AVERAGE | All-channel driving | Calculate the average of inputs (the latest values at the time) from channels are given in arguments |

TABLE 1-continued examples of request processing functions

| Type of request processing function | Driving mode | Processing |
|---|---|---|
| MAX | All-channel driving | Obtain the maximum value of inputs (the latest values at the time) from channels that are given in arguments |
| >= | Single-channel driving | Compare two arguments (for channels, inputs from them), and return "t" when the first argument is greater than or equal to the second argument, or "nil" otherwise |
| I | Single-channel driving | Output input from a channel that is given in the first argument to a channel that is given in the second argument |
| STAT | All-channel driving | Calculate a basic statistic amount (e.g., the maximum, minimum, average values, and the number of data items) of inputs (the latest values at the time) from channel that are given in arguments |

The two programs 1 and 2 shown in the example are common in that they utilize statistic values "A" to "F". Actually, "MAX" and "AVERAGE" in the two programs 1 and 2 have a common input and also involve similar processing. Therefore, assuming that one statistic amount can be derived by qualifying the output of the basic statistic function "STAT", the programs 1 and 2 can be rewritten using "STAT" as:

Program 1: (I(>=(STAT A B C D E F).average28)X)
Program 2: (I(>=(STAT A B C D E F).max80)Y).

In this example, the output of "STAT" is qualified in a window-like notation. For example, consider a window that records the latest value of a value recorded in a corresponding tag from a tagged data set like an XML fragment.

It is now understood that "(STAT A B C D E F)" in the programs 1 and 2 is identical processing (i.e., an identical request processing function). Sensor network application is particularly expected to involve a large quantity of such similar processing. To prevent increase in costs (e.g., band, delay, throughput, power consumption, and the like), identical processings are desirably unified.

For example, when the two programs above are put into operation as actual processing, only a request processing function that is common ("STAT A B C D E F") is instantiated and other request processing functions share the output of the request processing function ("STAT A B C D E F").

Figure 4:
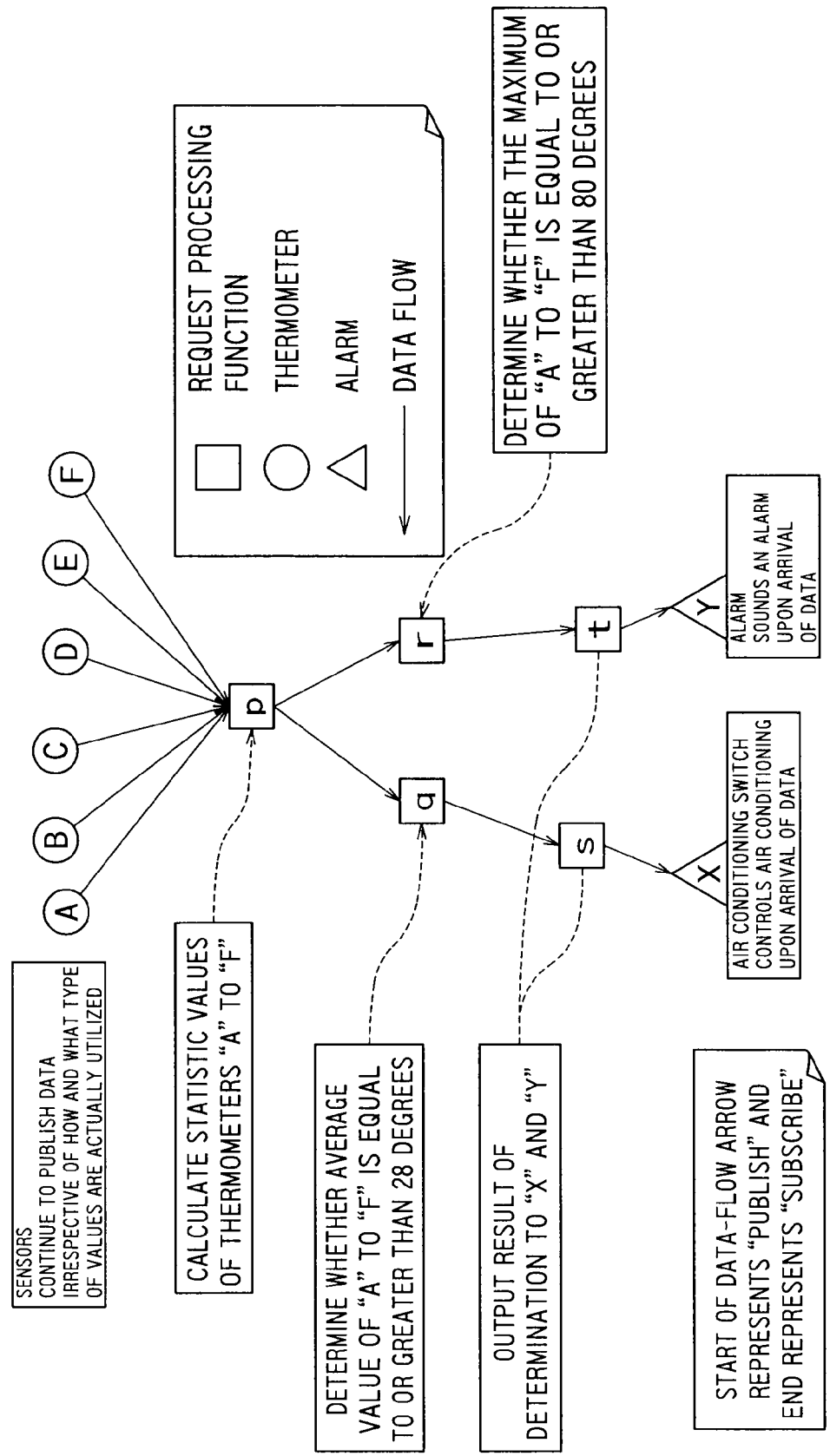
FIG. 4 shows an example of shared use of a request processing function.

FIG. 4 shows a specific example of shared use of a request processing function. In the figure, "p" corresponds to "STAT", "q" and "r" to ">=", and "s" and "t" to "I". And by having "STAT" be shared, data transfer from A through F to the two programs, which is of the largest amount, can be done in just one pass.

Thus, by instantiating only a request processing function that is common in the two programs shown above ("STAT A B C D E F") and sharing the output of the request processing function ("STAT A B C D E F") among other request processing functions, the same processing has to be performed just once.

The request allocation device of this embodiment thus analyzes a program input from a user device, and makes a function that is already instantiated among functions contained in the program to be shared and instantiates only functions that are not instantiated yet. Thus, by efficiently sharing common request processing functions, unnecessary consumption of resources can be avoided even when diverse programs are executed in a distributed programming infrastructure of a sensor network environment.

Figure 3:
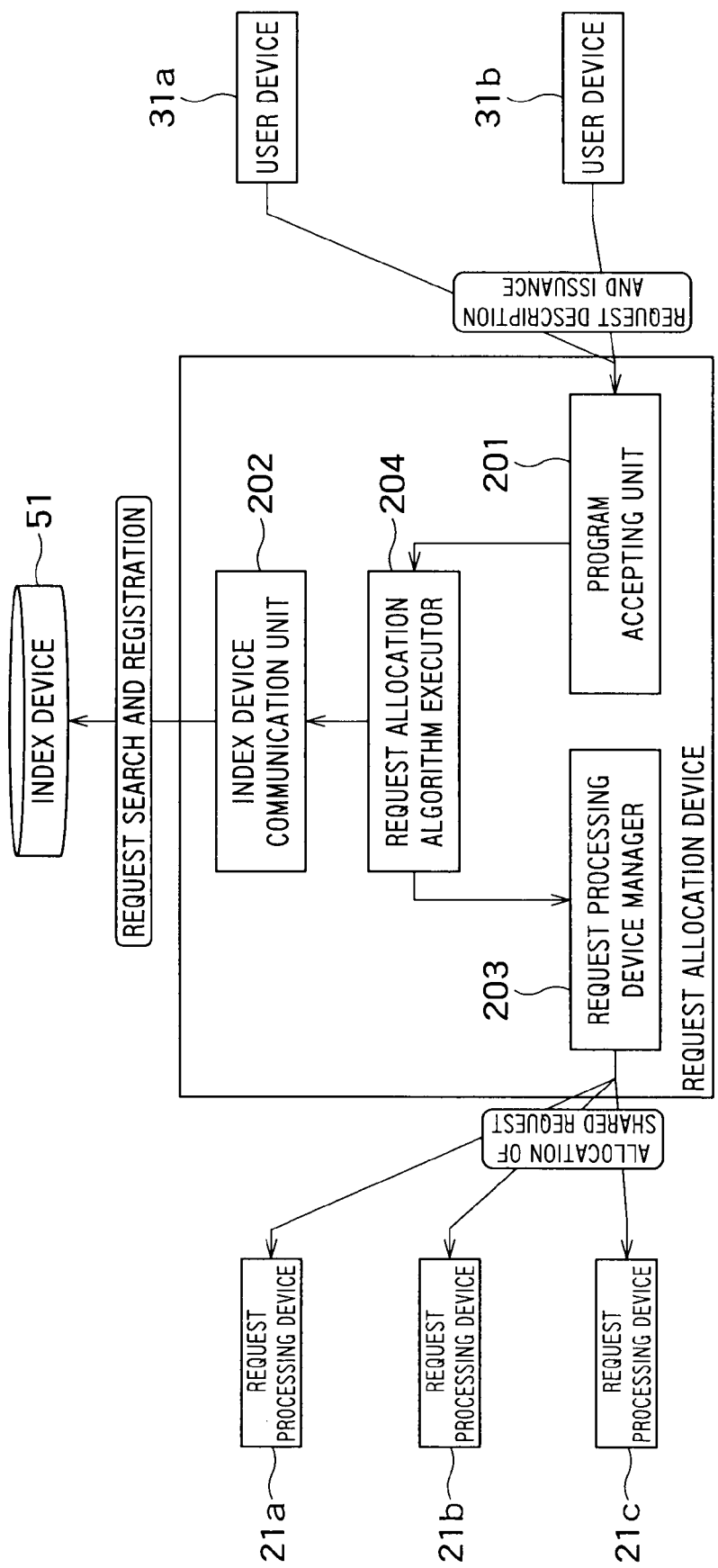
FIG. 3 shows the internal configuration of a request allocation device.

FIG. 3 shows a detailed configuration of the request allocation device 41.

The request allocation device 41 includes a program accepting unit 201, an index device communication unit 202, a request processing device manager (function providing unit) 203, and a request allocation algorithm executor (a registration requesting unit, an executor selecting unit) 204.

The program accepting unit 201 accepts input of a program which describes flow of data processing with a plurality of request processing functions, such as an S-expression, from the user device 31a or 32b, and introduces the program to the request allocation algorithm executor 204.

The request allocation algorithm executor 204 decomposes the program introduced from the program accepting unit 201 into a number of request processing functions, and requests the index device 51 via the index device communication unit 202 to examine whether each of the request processing functions is already registered on the index device 51 or not. The index device communication unit 202 functions as an interface for communication between the request allocation algorithm executor 204 and the index device 51.

As mentioned above, the index device 51 maintains a correspondence table (an index table) showing correspondence between character strings of request processing functions and channel information (a pair of character string of a request processing function and the identifier of a request processing device (control device)) (see FIG. 8). The index device 51 examines whether the character string of the request processing function specified by the request processing algorithm executor 204 is already registered in the index table, and returns the result of examination showing whether the function is already registered or not to the request allocation algorithm executor 204. This capability corresponds to the capability of the function detecting unit, for example.

For a request processing function that was determined to be not registered yet, the request allocation algorithm executor 204 selects a request processing device (a control device) that should instantiate the request processing function, and requests the index device 51 to register channel information which is a pair of the identifier of the selected request processing device (control device) and the character string of the request processing function as well as the character string of the request processing function. The request allocation algorithm executor 204 also requests the request processing device manager 203 to instantiate the request processing function that was determined to be not registered yet. Details of the request allocation algorithm executor 204 will be separately described below.

The index device 51 registers the character string of the request processing function and channel information (a pair of the character string of the request processing function and the request processing device identifier) specified by the request processing algorithm executor 204 in the index table. This function corresponds to the function of the identifier registering unit, for example. The index device 51 may also have a read cache for the index table.

While this embodiment shows an example where one index device is used by one request allocation device, a number of request allocation devices utilizing a single index device may be present in one system. In addition, while the index device and the request allocation device are configured as separate devices in this embodiment, they may be integrated into one device.

The request processing device manager (a function providing unit) 203 manages a list of request processing devices (control devices) that can be utilized by the request allocation device and the state of individual request processing devices (control devices) (e.g., load and failure). The request processing device manager 203 also performs processing for instantiation in response to a request for instantiating a request processing function from the request allocation algorithm executor 204. Specifically, it generates an object code (such as a Java (a registered trademark) code) that corresponds to the request processing function to be executed, and supplies the code to a request processing device (control device) specified by the request allocation algorithm executor 204. Rules of conversion between request processing functions and object codes are given in advance, and the object code corresponding to the request processing function is generated based on the rules. Alternatively, such rules may be described in a program input from a user device.

The request processing device (control device) instantiates the request processing function based on information given from the request processing device manager 203. Specifically, it keeps the request processing function (the object code) given, subscribes to the input channel for the function, and registers (creates) a channel (an output channel) having an identifier that is formed of the description of the function to the Publish-Subscribe broker 101.

Here, the request allocation algorithm executor 204 of the request allocation device 41 selects a request processing device (control device) that should instantiate a request processing function in the following manner, for example:

(1) For each of input and output channels of a request processing function, it is assumed that a request processing device (control device) that serves as a broker (master broker) entirely responsible for those channels and request processing devices (control devices) that have already subscribed to those channels are known. These request processing devices (control devices) are made candidates for request processing function execution environments in which the request processing function can be executed. The correspondence between channel identifiers and request processing devices (control devices) is managed by the index device (see the channel information of FIG. 8) or other means.

(2) The candidates for request processing function execution environments periodically report information including load (communication and computation loads per hour) on those request processing devices (control devices) to the request processing device manager 203 of the request allocation device. Here, any request processing device (control device) with load that has reached an upper limit threshold which is set for each request processing device (control device) is removed from consideration.

(3) From the remaining candidates, a request processing device (control device) that includes as many channels which are already subscribed to by action devices or other request processing functions as possible is selected (That is, a control device which has a total of the channels (i.e. first and third channels) that correspond to the input and output arguments specified by the function by a largest number or equal to or greater than a threshold number, is selected). This is because of the fact that subscriptions more than request processing devices (control devices) newly incurs communication costs between request processing devices (control devices).

(4) If no candidate is left after the procedure above, a request processing device (control device) with the lowest load is utilized. However, if all request processing devices (control device) are overloaded, instantiation of the request processing function is regarded as a failure and the user and the administrator may be alarmed (resource tightness).

Figure 5:
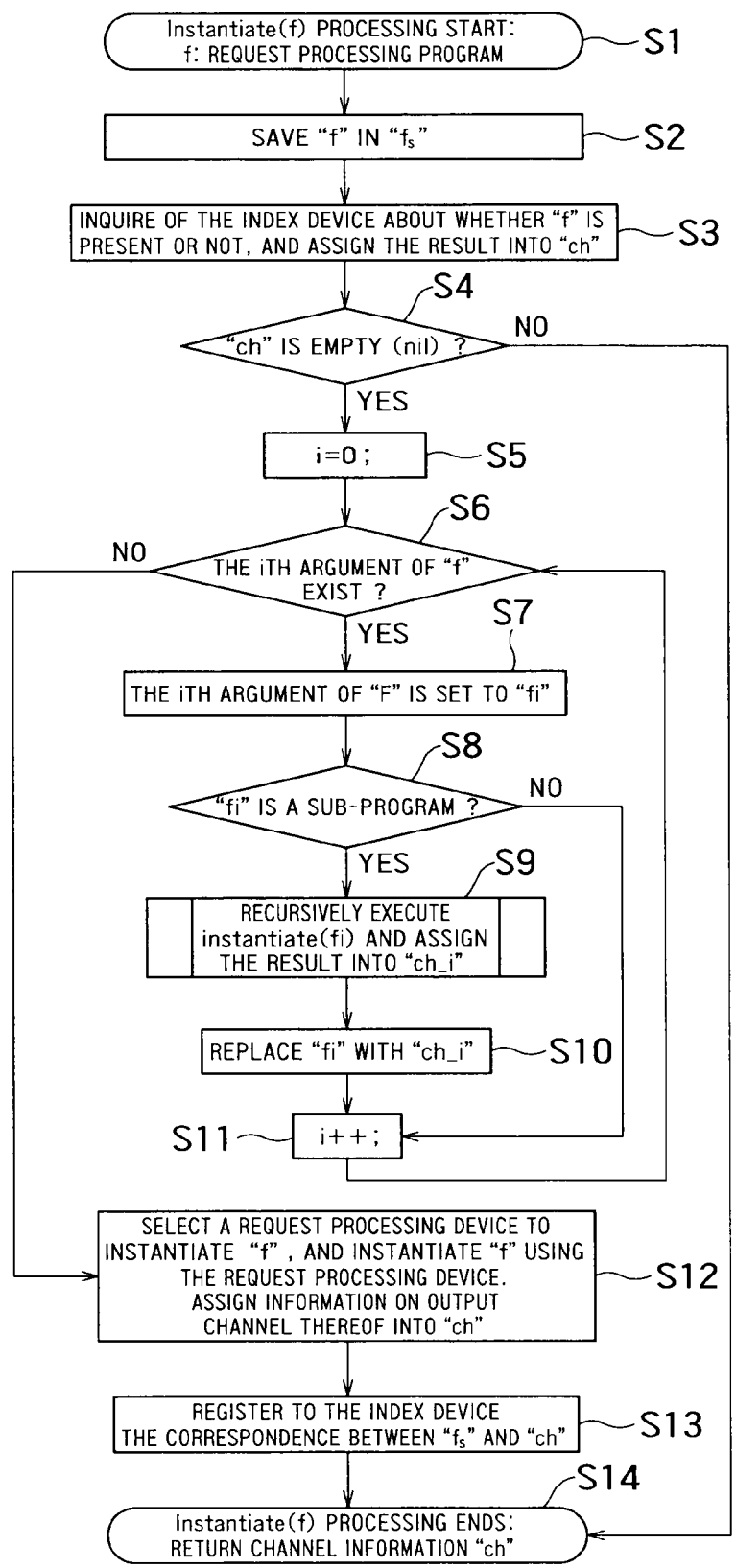
FIG. 5 is a flowchart illustrating the operation of the request allocation device (i.e., a request allocation algorithm)

FIG. 5 is a flowchart illustrating the operation of the request allocation device 41 (the request allocation algorithm). To the request allocation device 41, a program, e.g., the program 1 or 2 using "STAT" which are described above, is given from a user device. The request allocation device 41 processes the program according to the procedure of FIG. 5 and allocates it to a request processing device (control device). In the following, the procedure of FIG. 5 is generally shown and then described in further detail using specific examples.

S1: Start an instantiation procedure ("instantiate"). The program given from the user is "f". When "(|(>=(STAT A B C D E F).average28)X)" is given as the program, for example, this program is "f".

S2: Save the program "f" in "fs".

S3: Inquire of the index device 51 whether "f" is present or not, and the result is input to "ch" and returned. If channel information associated with "f" inquired is present, the index device 51 returns the channel information in "ch", and if such information is not present, the index device 51 returns "nil" (empty) in "ch". This step is equivalent to inquire whether a channel (a third channel) that has the character strings of the program "f" as its identifier or a function that executes the program "f" is already present in any request processing device (control device) or not.

S4: Check whether the contents of "ch" returned from the index device 51 is "nil", and it is not "nil", the flow proceeds to step S14 and this procedure is terminated. At the time of termination, a message informing that processing has been normally conducted may be sent back to the user device. Meanwhile, if the contents of "ch" returned from the index device 51 is "nil", "f" needs to be instantiated and thus the flow proceeds to step S5.

S5: Arguments specified in "f" may be actually constants, channels, or other request processing functions (a program fragment). Here, to evaluate the arguments in "f" in sequence, a variable "i" is initialized to 0. Hereinafter, the arguments are called the 0th argument, first argument . . . and so on starting from the initial argument. For example, for "(|(>=(STAT A B C D E F).average28)X)", the 0th argument is "(>=(STAT A B C D E F).average28)" and the first argument is "X". Description of an argument can be determined from function type.

S6: Verify the presence of the ith argument. If the ith argument does not exist, that is, evaluation of all arguments is completed, the processing skips to step S12. On the other hand, if the ith argument exists, the flow proceeds to step S7.

S7: Set the ith argument of "f" to "fi", e.g., f0=(>=(STAT A B C D E F).average28).

S8: Determine the type of "fi" and the flow proceeds to step S9 if it is a request processing function (a sub-program). Otherwise (i.e., "fi" is a constant, channel identifier, or the like), the flow proceeds to step S11. When f0: (>=(STAT A B C D E F).average28), it is a request processing function, thus the flow proceeds to step S9.

S9: With "fi" as the argument, start an instantiation procedure ("instantiate"). In other words, start processing from S1 for performing recursive processing. Channel information (a pair of the character string of "fi" and the request processing device (control device) identifier) which is returned as the result (returned at step S14, which is recursive processing) is assigned into "ch_i".

S10: Replace the request processing function "fi" contained in "f" with the channel information "ch_i".

S11: Increment "i" and return to step S6.

S12: As all arguments have been evaluated, select a request processing device (control device) for instantiating "f" and send an instantiation request for "f" for the selected request processing device (control device) to the request processing device manager 203. Also, information on a channel which will receive output of "f" (e.g., a pair of the character string of "f" itself and the identifier of the selected request processing device (control device)) is assigned into "ch".

S13: Register to the index device 51 the correspondence between the character string of "fs" and channel information "ch" for receiving the output of "fs" (a pair of the character string of "fs" and the identifier of the selected request processing device (control device)). After the registration, when an instantiation procedure for "f" is requested again, the channel information "ch" associated with "f" may be returned at step S3. Registration of character string of "fs" contained in the channel information "ch" (the character string of "fs" included in the right field in FIG. 8 discussed later) may be omitted. In that case, a pair of the character string of "f" and an identifier is returned as channel information "ch" for an inquiry to the index device 51 at step S3.

S14: If this step is reached after main processing of this flowchart, processing is terminated, and if this step is reached after recursive processing, channel information "ch" is returned to the caller.

Here, at the time of inquiry to the index device 51 at step S2 or registration to the index device 51 at step S12, the request processing function may also be normalized as mentioned above. With normalization, program processing which can involve various expressions is more likely to be sharable.

Figure 6:
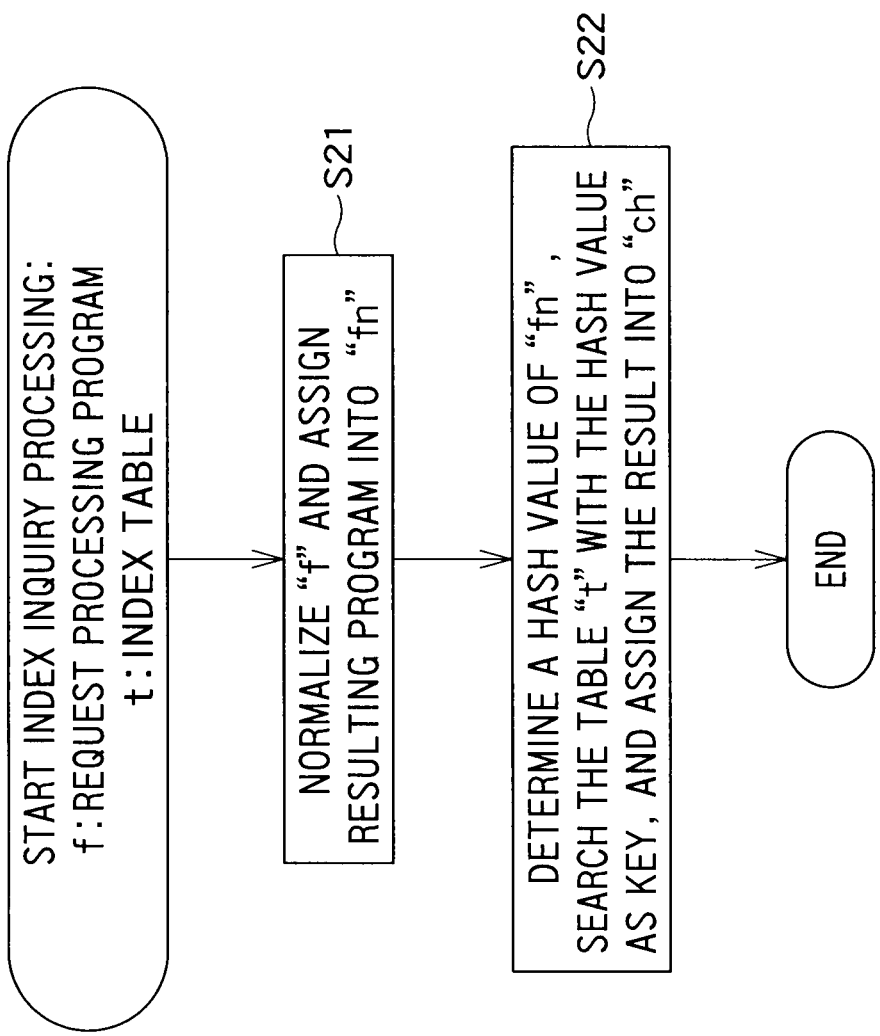
FIG. 6 is a flowchart illustrating the flow of request processing function inquiry that is adapted to normalization of the request processing function.

FIG. 6 is a flowchart illustrating an example flow of processing that is performed in place of step S2 of FIG. 5 when such normalization is applied.

At step S21, before inquiry to the index device 51, "f" is normalized and the normalized request processing function is assigned into "fn".

At step S22, a hash value of "fn" is calculated and an inquiry is made to the index device 51 with the resulting hash value as a key. The result of inquiry is input to "ch" and returned. In response to the inquiry, if associated channel information is present, the index device 51 returns the information in "ch", and if not present, it returns "nil" (empty) in "ch".

Figure 7:
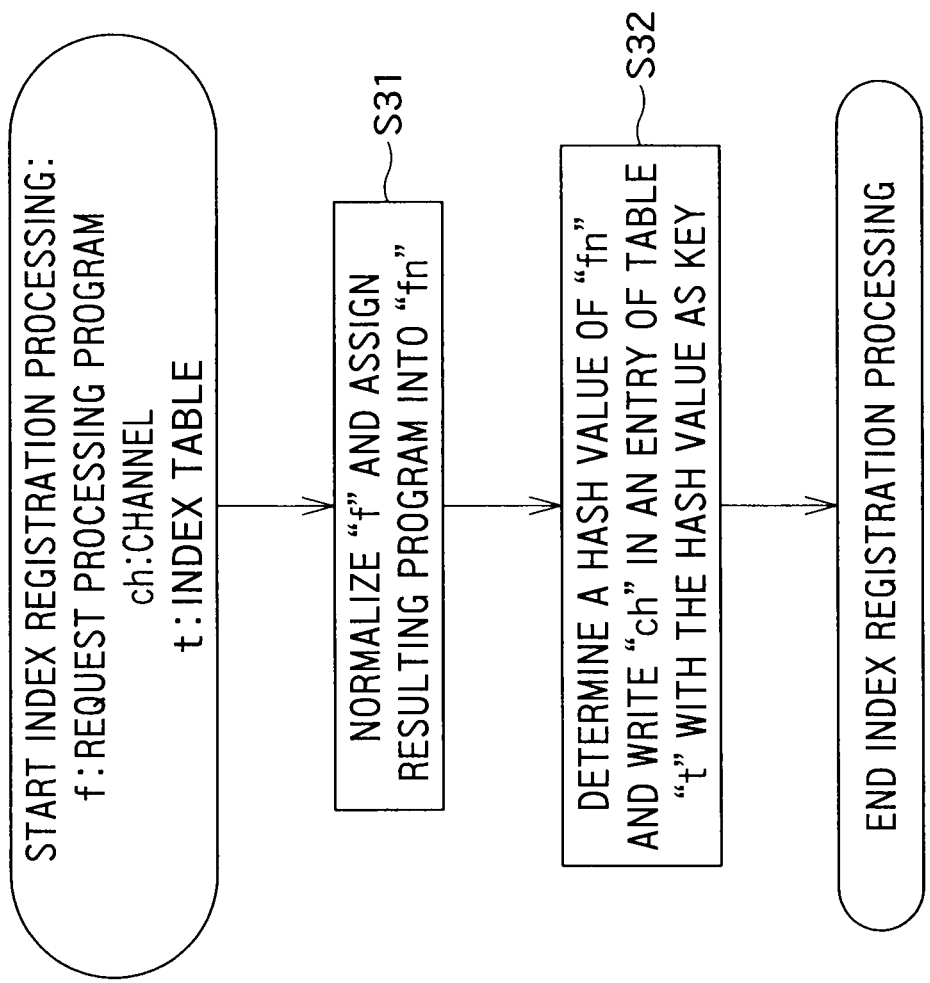
FIG. 7 is a flowchart illustrating the flow of request processing function registration that adapted to normalization of the request processing function.

FIG. 7 is a flowchart illustrating an example flow of processing that is performed in place of step S12 of FIG. 5 when the above-mentioned normalization is applied.

At step S31, before registration to the index device 51, "f" is normalized and the normalized request processing function is assigned into "fn".

At step S32, a hash value of "fn" is calculated, and channel information "ch" for receiving the output of "f" is registered in an entry having the resulting hash value as its key.

Here, the processing of FIG. 5 is described assuming that "(|(>=(STAT A B C D E F).average28)X)", which is the program 1, is actually input from a user device. For the sake of simplicity, however, normalization is not performed. Because this program has a channel qualifier, the program is converted as discussed above in subsequent processing to: "(|(>=(select(STAT A B C D E F)"average")28)X)". To briefly and additionally describe this program, this program includes four request processing functions:

(STAT A B C D E F)
(select(STAT A B C D E F)"average")
(>=(select(STAT A B C D E F)"average")28)
(|(>=(select(STAT A B C D E F)"average")28)X).

These request processing functions each designate as an argument at least one of: at least one first channel (here, A, B, C, D, E, and F), other request processing function, and a second channel ("X" here). For example, the third function designates "(select(STAT A B C D E F)"average")" and "28" as input arguments. The fourth request processing function specifies output to an output argument X, and generation of a channel corresponding to this function may be omitted. Arguments other than "X" all correspond to input arguments. In the following, a specific example of processing of FIG. 5 is provided.

(Main Processing)

First, at step S1, an instantiation procedure ("instantiate") is started. The program input from the user device is "(|(>=(STAT A B C D E F).average28)X)", which is set as "f". Since this program contains a channel qualifier, the program is converted as described above to: (|(>=(select(STAT A B C D E F)"average")28)X).

Then, at step S2, "f" is saved in "fs".

Then, at step S3, an inquiry is made to the index device 51 about whether "f" is present or not. It is assumed that "ch" containing "nil" (empty) is returned from the index device 51, and the flow proceeds to step S5.

Next, at step S5, a variable "i" is initialized to 0. Hereinafter, arguments are called the 0th argument, first argument, second argument . . . and so on starting from the initial argument. Here, the 0th is "(>=select(STAT A B C D E F)"average")28)", and the first argument is "X". The flow proceeds to step S6.

At step S6, the presence of the i=0th argument is verified, and the i=0th argument exists, so the flow proceeds to step S7.

At step S7, the 0th argument is set to "f0". Here, "f0" is "(>=select(STAT A B C D E F)"average")28)".

Then, at step S8, the type of "f0" is determined and it is a request processing function (a sub-program), thus the flow proceeds to step S9.

At step S9, with "f0" as the argument, an instantiation procedure ("instantiate") is started. That is, recursive processing 1 is entered.

(Recursive Processing 1)

At step S1, "f0" is regarded as "f", saving is performed at step S2, an inquiry is made to the index device at step S3, and assuming that "ch" containing "nil" (empty) is returned (YES at S4), the flow proceeds to step S5.

At step S5, the variable "i" is initialized to 0. The 0th variable is "(select(STAT A B C D E F)"average")" and the first variable is 28. As the i=0th argument exists (YES at S6), the flow proceeds to step S7, where the 0th argument is set to "f0". Here, "f0" is '(select(STAT A B C D E F)"average")'.

Then, at step S8, the type of "f0" is determined, and it is a request processing function, thus the flow proceeds to step S9.

At step S9, with "f0" as the argument, an instantiation procedure ("instantiate") is started. That is, recursive processing 2 is entered.

(Recursive Processing 2)

At step S1, "f0" is regarded as "f", saving is performed at step S2, an inquiry is made to the index device at step S3, and assuming that "ch" containing "nil" (empty) is returned (YES at S4), the flow proceeds to step S5.

At step S5, variable "i" is initialized to 0. The 0th variable is "(STAT A B C D E F)" and the first variable is "average". As the i=0th argument exists (YES at S6), the flow proceeds to step S7, where the 0th argument is set to "f0". Here, "f0" is "(STAT A B C D E F)".

Then, at step S8, the type of "f0" is determined, and it is a request processing function, thus the flow proceeds to step S9.

At step S9, with "f0" as the argument, an instantiation procedure ("instantiate") is started. That is, recursive processing 3 is entered.

(Recursive Processing 3)

At step S1, "f0" is regarded as "f", saving is performed at step S2, an inquiry is made to the index device at step S3, and assuming that "ch" containing "nil" (empty) is returned (YES at S4), the flow proceeds to step S5.

At step S5, variable "i" is initialized to 0. The 0th variable is "A", the first argument is "B", the second variable is "C", the third argument is "D", the fourth variable is "E", and the fifth argument is "F". As the i=0th argument exists (YES at S6), the flow proceeds to step S7, where the 0th argument is set to "f0". Here, "f0" is "A".

At step S8, the type of "f0" is determined, and it is not a request processing function. Thus, the flow proceeds to step S11, where "i" is incremented by one.

Returning to step S6, as the i=1st argument exists (YES at S6), the flow proceeds to step S7, where the first argument is set to "f1". Here, "f1" is "B".

At step S8, the type of "f1" is determined, and it is not a request processing function. Thus, the flow proceeds to step S1, where "i" is incremented by one.

Since the second variable "C", the third argument "D", the fourth variable "E", and the fifth argument "F" are all not request processing functions, they undergo similar processing and determination at step S6 results in "NO", and the flow proceeds to step S12.

At step S12, a request processing device (control device) for instantiating "f" is selected, and an instantiation request for "f" for the selected request processing device (control device) is sent to the request processing device manager 203. Also, information on a channel that will receive output of "f", namely a pair of "(STAT A B C D E F)" and the identifier of the selected request processing device (control device) is assigned into "ch".

At step S13, the correspondence between "(STAT A B C D E F)" and channel information "ch" is registered to the index device 51 (see the second row of the index table of FIG. 8).

At step S14, recursive processing 3 is terminated by returning the channel information "ch". Specifically, the flow returns to step S9 in the recursive processing 2, where the channel information "ch" returned in recursive processing 3 is assigned into "ch_0".

(Recursive Processing 2)

At step S10, "f0" which is the 0th argument in "f" is replaced with "ch_0", "i" is incremented by one, and the flow returns to step S6.

As the i=1st argument exists (YES at S6), the flow proceeds to step S7, where the first argument is set to "f1". Here, "f1" is "average".

Then, at step S8, the type of "f1" is determined and it is not a request processing function. Thus, the flow proceeds to step S1, where "i" is incremented by one.

As the i=2nd argument does not exist (NO at S6), the flow proceeds to step S12.

At step S12, a request processing device (control device) for instantiating "f" is selected, and an instantiation request for "f" for the selected request processing device (control device) is sent to the request processing device manager 203. Also, channel information, namely a pair of '(select(STAT A B C D E F)"average")' and the identifier of the selected request processing device (control device) is assigned into "ch".

At step S13, the correspondence between '(select((STAT A B C D E F)"average")' and channel information "ch" is registered to the index device 51 (see the fourth row of the index table of FIG. 8).

At step S14, recursive processing 2 is terminated by returning the channel information "ch". Specifically, the flow returns to step S9 in the recursive processing 1, where the channel information "ch" returned in recursive processing 2 is assigned into "ch_0".

(Recursive Processing 1)

At step S10, "f0" is replaced with "ch_0", "i" is incremented by one, and the flow returns to step S6.

As the i=1st argument exists (YES at S6), the flow proceeds to step S7, where the first argument is set to "f1". Here, "f1" is "28".

Then, at step S8, the type of "f1" is determined and it is not a request processing function. Thus, the flow proceeds to step S11, where "i" is incremented by one.

As the i=2nd argument does not exist (NO at S6), the flow proceeds to step S12.

At step S12, a request processing device (control device) for instantiating "f" is selected, and an instantiation request for "f" for the selected request processing device (control device) is sent to the request processing device manager 203. Also, channel information, namely a pair of '(>=(select (STAT A B C D E F) "average")28)' and the identifier of the selected request processing device (control device) is assigned into "ch".

At step S13, the correspondence between '(>=(select ((STAT A B C D E F)"average")' and channel information "ch" is registered to the index device 51 (see the third row of the index table of FIG. 8).

At step S14, recursive processing 1 is terminated by returning the channel information "ch". Specifically, the flow returns to step S9 in the main processing 0, where the channel information "ch" returned in recursive processing 1 is assigned to "ch_0".

(Main Processing)

At step S10, "f0" is replaced with "ch_0", "i" is incremented by one, and the flow returns to step S6.

As the i=1st argument exists (YES at S6), the flow proceeds to step S7, where the first argument is set to "f1". Here, "f1" is "X".

Then, at step S8, the type of "f1" is determined and it is not a request processing function. Thus, the flow proceeds to step S11, where "i" is incremented by one.

As the i=2nd argument does not exist (NO at S6), the flow proceeds to step S12.

At step S12, a request processing device (control device) for instantiating "f" is selected, and an instantiation request for "f" for the selected request processing device (control device) is sent to the request processing device manager 203. Also, channel information, namely a pair of "(|(>=select (STAT A B C D E F).average28)X)" and the identifier of the selected request processing device (control device) is assigned into "ch".

At step S13, the correspondence between "(|(>=select (STAT A B C D E F).average28)X)" and channel information "ch" is registered to the index device 51.

At step S14, this processing is terminated.

As described above, according to this embodiment, efficient program execution is possible by sharing a request processing function that performs processing common to multiple programs when a large number of programs are run in the same environment. This allows more programs to be simultaneously executed when they are in the same environment. In addition, a sensor network can be built with less expensive equipment for obtaining equivalent performance or many programs can be executed with less energy.

What is claimed is:

1. A control system comprising:
a control device for controlling a plurality of actuators by executing a plurality of functions based on sensor values from a plurality of external sensors and a function providing device for providing the control device with the functions to be executed by the control device, wherein
(A) the function providing device comprises:
a program accepting unit configured to accept a program containing a plurality of functions, from a user device wherein
  each of the functions in the program has as an input argument an identifier of least one of: the external sensors and other functions than said each of the functions such that the functions in the program are to be executed in a stepwise fashion, and
  at least one of the functions in the program has as an output argument an identifier of showing at least one of the actuators;
an identifier storage configured to store a plurality of identifiers of functions in correspondence to respective channel information for each identifier of a function;
a function detecting unit configured to detect a function for which a matching identifier is not stored in the identifier storage among the functions contained in the program, by searching the identifier storage;
an identifier registering unit configured to newly register the identifier of the detected function in the identifier storage; and
a function providing unit configured to provide the detected function to the control device,
(B) the control device comprises:
a function accepting unit configured to accept the function detected by the function providing unit of the function providing device;
a function storage configured to store functions accepted by the function accepting unit;
a function executing unit configured to receive an input argument of each of the functions stored in the function storage, and execute each of the functions based on the input argument of each of the functions;
a first channel managing unit configured to manage a plurality of first channels corresponding to the external sensors, receive the sensor values via the first channels from the external sensors, and transmit each of the sensor values received for each of the first channels to the function executing unit as an input argument of each of the functions that is pre-instructed for each of the first channels;
a second channel managing unit configured to manage each of a plurality of second channels corresponding to each of the actuators, and transmit each of values received with designation of each of the second channels to each of the actuators corresponding to each of the second channels;
an output argument transmission processor configured to transmit a value of the output argument obtained by execution of a function that contains the output argument among the functions executed by the function executing unit, to the second channel managing unit with designation of the second channel that corresponds to the actuator designated by the output argument;
a third channel generating unit configured to generate a third channel correspondingly to the function accepted by the function accepting unit when the function accepting unit accepts the function from the function providing device;
a third channel managing unit configured to manage a plurality of third channels generated by the third channel generating unit, and transmit each of values received via each of the third channels to the function executing unit as an input argument of each of the functions that is pre-instructed for each of the third channels;
a function output transmission processor configured to transmit an output value of each of the functions in the function storage that results from execution thereof to the third channel managing unit with designation of each of the third channels that corresponds to each of the functions; and
a transmission instructing unit configured to identify a first or third channel corresponding to one of the external sensors or one of the other functions that is designated as the input argument of the function accepted by the function accepting unit, and instruct the first channel managing unit or the third channel managing unit to transmit a value received from the external sensor via the identified first channel or from the function output transmission processor via the identified third channel to the function executing unit as the input argument of the function.

2. The control system according to claim 1, wherein
each of the identifiers in the identifier storage is a character string indicating each of the functions corresponding to each of the identifiers;
the function providing device further comprises a normalizing unit configured to normalize the character string of each of the functions contained in the program;
the function detecting unit of the function providing device searches the identifier storage based on the normalized character string;
the identifier registering unit of the function providing device registers the normalized character string in the identifier storage when a character string matching the normalized character string is not stored in the identifier storage; and
the function providing unit of the function providing device provides the control device with a function formed as the normalized character string.

3. The control system according to claim 1, wherein
each of the identifiers in the identifier storage is a code expression of each of the functions corresponding to each of the identifiers;
the function providing device further comprises an encoding unit configured to encode each of the functions contained in the program to obtain a code expression;
the function detecting unit of the function providing device searches the identifier storage based on the obtained code expression; and
the identifier registering unit of the function providing device registers the obtained code expression in the identifier storage when the obtained code expression is not stored in the identifier storage.

4. The control system according to claim 1, comprising a plurality of the control devices, wherein
the function providing device further comprises an executor selecting unit configured to select a control device that is to execute the function detected by the function detecting unit among the control devices, and the function providing unit provides the detected function to the control device selected by the executor selecting unit.

5. The control system according to claim 4, wherein
the control devices are interconnected via a network;
the control devices are connected to different ones of the external sensors and different ones of the actuators;
when the second channel to be designated is present in another one of the control devices, the output argument transmission processor of the control device performs the transmission to the second channel managing unit of the another control device;
when the pre-instructed function is present in another control device, the first channel managing unit of the control device performs transmission to the function executing unit of the another control device;
when the pre-instructed function is present in another control device, the third channel managing unit of the control device performs transmission to the function executing unit of the another control device; and
when the first or third channel is present in another control device, the transmission instructing unit of the control device instructs transmission of the value to the first channel managing unit or the third channel managing unit of the another control device.

6. The control system according to claim 4, wherein
the executor selecting unit of the function providing device selects a control device that has a total of the first and third channels that correspond to the input and output arguments specified by the detected function by a largest number or equal to or greater than a threshold number, among the control devices.

7. The control system according to claim 4, wherein
the executor selecting unit of the function providing device selects a control device with lowest load or with load equal to or lower than a threshold value, among the control devices.

8. The control system according to claim 1, wherein
the function providing device includes:
a request allocation device that includes both of the program accepting unit and the function providing unit; and
an index device that includes all of the identifier storage, the function detecting unit, and the identifier registering unit, wherein
the request allocation device further comprises an examination requesting unit configured to request the index device to examine whether each of the functions contained in the program is registered in the identifier storage or not by specifying the identifier of each of the functions, and receive a result of examination that shows whether each of the functions is registered or not from the index device, and
the function detecting unit of the index device searches the identifier storage in response to an examination request from the request allocation device and notifies the request allocation device of the result of examination.

9. A control device for controlling a plurality of actuators by executing a plurality of functions based on sensor values from a plurality of external sensors, comprising:
a function accepting unit configured to accept a function from an external function providing device, wherein the function has as an input argument an identifier of at least one of: the external sensors and other functions than said each of the functions such that the functions in the program are to be executed in a stepwise fashion, and has as an output argument an identifier of at least one of the actuators;
a function storage configured to store functions accepted by the function accepting unit;
a function executing unit configured to receive an input argument of each of the functions stored in the function storage, and execute each of the functions based on the input argument of each of the functions;
a first channel managing unit configured to manage a plurality of first channels corresponding to the external sensors, receive the sensor values via the first channels from the external sensors, and transmit each of the sensor values received for each of the first channels to the function executing unit as an input argument of each of the functions that is pre-instructed for each of the first channels;
a second channel managing unit configured to manage each of a plurality of second channels corresponding to each of the actuators, and transmit each of values received via each of the second channels to each of the actuators corresponding to each of the second channels;
an output argument transmission processor configured to transmit a value of the output argument obtained by execution of a function that contains the output argument among the functions executed by the function executing unit, to the second channel managing unit with designation of the second channel that corresponds to the actuator designated by the output argument;
a third channel generating unit configured to generate a third channel correspondingly to the function accepted by the function accepting unit when the function accepting unit accepts the function from the external function providing device;
a third channel managing unit configured to manage a plurality of third channels generated by the third channel generating unit, and transmit each of values received via each of the third channels to the function executing unit as an input argument of each of the functions that is pre-instructed for each of the third channels;
a function output transmission processor configured to transmit an output value of each of the functions in the function storage that results from execution thereof to the third channel managing unit with designation of each of the third channels that corresponds to each of the functions; and
a transmission instructing unit configured to identify a first or third channel corresponding to one of the external sensors or one of the other functions that is designated as the input argument of the function accepted by the function accepting unit, and instruct the first channel managing unit or the third channel managing unit to transmit a value received from the external sensor via the identified first channel or from the function output transmission processor via the identified third channel to the function executing unit as the input argument of the function.

10. A control method for controlling a plurality of actuators by executing a plurality of functions based on sensor values from a plurality of external sensors, comprising:
accepting a program containing a plurality of functions, from a user device wherein each of the functions in the program has as an input argument an identifier of at least one of: the external sensors and other functions than said each of the functions such that the functions in the program are to be executed in a stepwise fashion, and at least one of the functions in the program has as an output argument an identifier of at least one of the actuators;
searching an identifier storage which stores a plurality of identifiers of functions in correspondence to respective channel information for each identifier of a function, and detecting a function for which a matching identifier is not stored in the identifier storage among the functions contained in the program;

newly registering the identifier of the detected function in the identifier storage; and storing the detected function in a function storage;

receiving an input argument of each of functions stored in the function storage, and performing execution processing on each of the functions based on the input argument of each of the functions;

performing first management processing on a plurality of first channels corresponding to the external sensors, receiving the sensor values via the first channels from the external sensors, and transmitting each of the sensor values received for each of the first channels to the execution processing as an input argument of each of the functions that is pre-instructed for each of the first channels;

performing second management processing on each of a plurality of second channels corresponding to each of the actuators, and transmit each of values received via each of the second channels to each of the actuators corresponding to each of the second channels;

transmitting a value of the output argument obtained by execution of a function that contains the output argument among the functions executed by the execution processing, to the second management processing with designation of the second channel that corresponds to the actuator designated by the output argument;

generating, when the function for which a matching identifier is not stored in the identifier storage is detected, a third channel correspondingly to the detected function;

performing third management processing on a plurality of third channels generated, and transmitting each of values received via each of the third channels to the execution processing as an input argument of each of the functions that is pre-instructed for each of the third channels;

transmitting an output value of each of the functions in the function storage that results from execution thereof to the third management processing with designation of each of the third channels that corresponds to each of the functions; and identifying a first or third channel corresponding to one of the external sensors or one of the other functions that is designated as the input argument of the detected function, and instruct the first management processing or the third management processing to transmit a value received via the identified first or identified third channel to the execution processing as the input argument of the function.

11. The apparatus according to claim 1, wherein the third channel generating unit sets, as an identifier of the third channel corresponding to the function, a code expression itself of the function.

12. The apparatus according to claim 11, wherein the code expression of the function is a character string of the function, XML (Extensible Markup Language) expression, or a tree-structured program expression that is normalized.

13. The control device according to claim 9, wherein the third channel generating unit sets, as an identifier of the third channel corresponding to the function, a code expression itself of the function.

14. The control device according to claim 13, wherein the code expression of the function is a character string of the function, XML (Extensible Markup Language) expression, or a tree-structured program expression that is normalized.

15. The control method according to claim 12, wherein the control method comprises setting, as an identifier of the third channel corresponding to the function, a code expression itself of the function.

16. The control method according to claim 15, wherein the code expression of the function is a character string of the function, XML (Extensible Markup Language) expression, or a tree-structured program expression that is normalized.

17. The apparatus according to claim 1, wherein
sensor values acquired by the external sensors are transmitted to the first channel managing unit via the respective first channels, the first channel managing unit transmits the received sensor values to the function executing unit, as input arguments of the functions pre-instructed for the first channels, the function executing unit specifies and executes functions which have the sensor values received from the first channel managing unit as input arguments, among the functions in the function storage, the output argument transmission processor transmits a value of the output argument obtained by execution of the function that contains the output argument among the functions executed by the function executing unit, to the second channel managing unit with designation of the second channel corresponding to the actuator specified by the output argument, the second channel managing unit transmits the value received with designation of the second channel from the output argument transmission processor to the actuator corresponding to the second channel designated, the function output transmission processor transmits an output value of each of functions which have no output argument among the functions executed by the function executing unit, to the third channel managing unit with designation of each of the third channels corresponding to each of the functions executed, the third channel managing unit transmits the output value received with designation of each of the third channels from the function output transmission processor, to the function executing unit, as the input argument of the function pre-instructed for each of the third channels, and the function executing unit executes the function pre-instructed for each of the third channels by using the output value received with designation of each of the third channels as the input argument.

18. The control device according to claim 9, wherein
sensor values acquired by the external sensors are transmitted to the first channel managing unit via the respective first channels, the first channel managing unit transmits the received sensor values to the function executing unit, as input arguments of the functions pre-instructed for the first channels, the function executing unit specifies and executes functions which have the sensor values received from the first channel managing unit as input arguments, among the functions in the function storage, the output argument transmission processor transmits a value of the output argument obtained by execution of the function that contains the output argument among the functions executed by the function executing unit, to the second channel managing unit with designation of the second channel corresponding to the actuator shown by the output argument, the second channel managing unit transmits the value received with designation of the second channel from the output argument transmission processor to the actuator corresponding to the second channel designated, the function output transmission processor transmits an output value of each of functions which have no output argument among the functions executed by the function executing unit, to the third channel managing unit with designation of each of the third channels corresponding to each of the functions executed, the third channel managing unit transmits the output value received with designation of each of the third channels from the function output transmission processor, to the function executing unit, as the input argument of the function pre-instructed for each of the third channels, and the function executing unit executes the function pre-instructed for each of the third channels by using the output value received with designation of each of the third channels as the input argument.

19. The control method according to claim 12, wherein the method further comprises transmitting sensor values acquired by the external sensors to the first channel managing processing via the respective first channels, transmitting the received sensor values to the execution processing, as input arguments of the functions pre-instructed for the first channels and specifying and executing functions which have the sensor values received from the first channel managing unit as input arguments, among the functions in the function storage, transmitting a value of the output argument obtained by execution of the function that contains the output argument among the functions executed on the execution processing, to the second channel managing processing with designation of the second channel corresponding to the actuator specified by the output argument, transmitting the value received with designation of the second channel to the actuator corresponding to the second channel designated, transmitting an output value of each of functions which have no output argument among the functions executed on the execution processing, to the third channel managing processing with designation of each of the third channels corresponding to each of the functions executed, transmitting the output value received with designation of each of the third channels, to the execution processing, as the input argument of the function pre-instructed for each of the third channels, and executing the function pre-instructed for each of the third channels by using the output value received with designation of each of the third channels as the input argument.

* * * * *